United States Patent [19]

Bengtsson et al.

[11] Patent Number: 4,800,074

[45] Date of Patent: Jan. 24, 1989

[54] PROCESS FOR THE PRODUCTION OF HYDROGEN PEROXIDE

[75] Inventors: Erik Bengtsson, Surte; Ulf Andersson, Gothenburg, both of Sweden

[73] Assignee: EKA Nobel AB, Surte, Sweden

[21] Appl. No.: 171,107

[22] Filed: Mar. 21, 1988

[51] Int. Cl.$^4$ .............................................. C01B 15/02
[52] U.S. Cl. ..................................................... 423/588
[58] Field of Search ........................................... 423/588

[56] References Cited

U.S. PATENT DOCUMENTS

| | | | |
|---|---|---|---|
| 3,767,778 | 10/1973 | Giesselmann et al. | 423/588 |
| 4,046,868 | 9/1977 | Vaughan | 423/588 |
| 4,349,526 | 9/1982 | Goor et al. | 423/588 |
| 4,394,369 | 7/1983 | Ranbom | 423/588 |
| 4,428,923 | 1/1984 | Kunkel et al. | 423/588 |

FOREIGN PATENT DOCUMENTS

| | | | |
|---|---|---|---|
| 2018686 | 10/1971 | Fed. Rep. of Germany | 324/588 |
| 2532819 | 1/1977 | Fed. Rep. of Germany | . |
| 44480 | 7/1981 | Sweden | . |

Primary Examiner—John Doll
Assistant Examiner—Wayne A. Langel
Attorney, Agent, or Firm—Fred Philpitt

[57] ABSTRACT

A process for the production of hydrogen peroxide according to the anthraquinone process. According to the process certain cyclic urea derivatives are used as solvents, and particularly as solvents for anthrahydroquinones. The cyclic urea derivatives whcih can be N,N'-dialkyl substituted alkyleneurea, give a very good solubility for anthrahydroquinones and also for anthraquinones. The compounds can be used as the sole solvent at the production of hydrogen peroxide or in combination with conventionally used solvents such as hydrocarbons.

6 Claims, No Drawings

PROCESS FOR THE PRODUCTION OF HYDROGEN PEROXIDE

The present invention relates to the production of hydrogen peroxide according to the per se well known anthraquinone process. More particularly the invention relates to the production of hydrogen peroxide according to the anthraquinone process using particular solvents which give very good solubility for anthrahydroquinones and also for anthraquinones. The solvents used according to the present invention are certain cyclic urea derivatives.

In the production of hydrogen peroxide according to nown so-called anthraquinone processes alkyl- or alkenyl-substituted anthraquinones and/or tetrahydroanthraquinones are hydrogenated to the corresponding anthrahydroquinones in a solvent in the presence of a catalyst. After separation of the catalyst the hydroquinones are oxidized by means of air or oxygen and hereby hydrogen peroxide is obtained and the original anthraquinones are regenerated. The hydrogen peroxide is removed, eg by extraction, and the anthraquinones are recycled to the hydrogenation step. The extracted hydrogen peroxide is usually destilled to obtain higher concentrations.

In the anthraquinone process a combination of two different types of solvents is usually used and of these one should be capable to dissolving high amounts of anthraquinone while the other should dissolve high amounts of anthrahydroquinone. As solvents for anthraquinones hydrocarbons, aromatic, aliphatic or naphtenic hydrocarbons, or mixtures of these, are usually used. As solvents for anthrahydroquinones polar solvents or compounds are used and well known such solvents or compounds are aliphatic alcohols, usually with 5 to 12 carbon atoms, eg 2-octanol and diisobutylcarbinol, and phosphoric acid esters such as trioctyl phosphate. Certain nitrogen containing compounds are also known as solvents in the anthraquinone process and particularly as solvents for the hydroquinones. U.S. Pat. No. 4046868 discloses the use of carboxylic acid amides in which the nitrogen is substituted with alkyl groups as solvents in the anthraquinone process. The German patent application No. 2018686 discloses symmetrically or asymmetrically alkyl- or arylsubstituted urea as solvent. U.S. Pat. No. 4,394,369 discloses the use of alkyl substituted pyrrolidone as solvent.

According to the present invention it has been found that certain cyclic urea derivatives, which are characteristic in that they contain the group

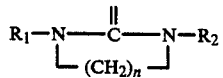

wherein n=1–5 and wherein $R_1$ and $R_2$ are an alkyl groups, are excellent solvents for anthrahydroquinones and also for anthraquinones. The compounds can be classified as alkyl-substituted cyclic urea derivatives. Compared with previously known types of nitrogen containing solvents, eg tetraalkyl substituted urea, a substantial and unexpected improvement of the hydroquinone solubility and also of the quinone solubility is obtained. In the anthraquinone process the compounds are advantageous as solvents also in other aspects of importance for the process and the hydrogen peroxide yield. They have, for example, low miscibility with water which is important with regard to the purity of the hydrogen peroxide extract. The compounds further have a suitable low viscosity and high boiling point for use in the production of hydrogen peroxide. It is also of great advantage that the distribution coefficient for hydrogen peroxide between water and solvent mixture is such that water solutions of high concentration can be obtained, but not high enough to cause the appearance of explosive emulsion together with the organic solvents.

The present invention thus relates to a process for the production of hydrogen peroxide by reduction and oxidation of an anthraquinone wherein as solvent is used a compound having the general formula

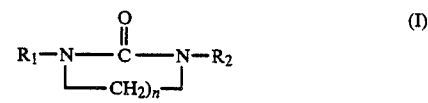

wherein n=1–5 and wherein $R_1$ and $R_2$ are alkyl groups having from 1 to 22 carbon atoms. According to the invention it is preferred to use compounds of the above given formula I wherein n=2–4. The preferred compounds are thus N,N'-dialkyl substituted alkylene urea.

As the compounds are used as solvents in a hydrogenation process they must of course not themselves contain unsaturations. $R_1$ and $R_2$ are alkyl groups having from 1 to 22 carbon atoms. With increasing carbon chain length for $R_1$ and $R_2$ the lipophilic properties of the compounds increase which results in a decreased water miscibility. However, if the compounds have too high lipophilic properties the anthrahydroquinone solubility decreases and it also results in a higher viscosity and because of this $R_1$ and $R_2$ suitably contain 3 to 18 carbon atoms and preferably 4 to 8 carbon atoms, while $R_2$ preferably has the same meaning as $R_1$. A certain water solubility of the compounds can be allowed, but it should not exceed 1 percent by weight. The compounds have low vapour pressures and hereby it is simple to obtain a condensate which can be used for washing the obtained hydrogen peroxide. The stability of the compounds depends on the size of the ring structure and it is preferred that the ring structure has from 4 to 8 members, ie compounds of formula I wherein n is 2 to 4, are preferred. As some examples of specific suitable compounds can be mentioned dibutyl trimethyleneurea (=dibutylpropyleneurea), dipentyl propyleneurea, dihexyl propyleneurea, dibutyl butyleneurea, dihexyl butyleneurea etc.

Most of the compounds of the type which according to the present invention are used as solvents at the production of hydrogen peroxide are per se previously known and available. Compounds of the type dialkyl alkyleneurea can eg be prepared starting from a mixture of dioxane, alkyleneurea and sodium hydride, to which is added an alkyl iodide, followed by reflux heating of the reaction mixture. After filtration the solvent is evaporated and vacuum distillation of the residue gives the desired dialkyl alkyleneurea.

In the present process for the production of hydrogen peroxide according to the anthraquinone process any anthraquinone starting material can be used. The terms anthraquinone and quinone are herein used for the per se well known anthraquinones with aliphatic substituents and the hydroanthraquinones such as the tetrahydro derivatives of these. As examples of anthraquinones and anthrahydroquinones can be mentioned 2-ethylanthraquinone, 2-t-butylanthraquinone, 2-amylanthraquinone, 2-hexenylanthraquinone and their tetrahydro derivatives. The terms anthraquinones and quinones are also used to comprise carbonic acid esters and sulphonic acid esters and other anthraquinone derivatives per se known as reaction carriers. It is particularly advantageous that the compounds according to the invention have a very good solubility for the anthraquinones which for economical reasons are preferred in the hydrogen peroxide production, namely 2-ethylanthraquinone and 2-ethyl-5,6,7,8-tetrahydroanthraquinone, as their use earlier has been limited to a certain extent due to a comparatively low solubility in the most commonly used solvents.

The cyclic urea derivatives can according to the invention be used as the sole solvent as they have both good anthraquinone solubility and anthrahydroquinone solubility. From economical reasons it is, however, suitable to use them primarily as solvents for anthrahydroquinones and thus in combination with conventional solvents for anthraquinones, such as aromatic, aliphatic and naphtenic hydrocarbons. In combination with these solvents the compounds of the invention give a substantially improved hydroquinone solubility at substantially higher ratios of hydrocarbon solvent to hydroquinone solvent, for example compared with the known combination of hydrocarbon solvent and diisobutylcarbinol. For mixtures with hydrocarbon solvents the volume ratio between this and the present cyclic nitrogen containing compounds is suitably within the range of from 100:1 to 1:1, suitably from 100:1 to 2:1. If desired, the compounds can of course also be used in combination with known compounds such as phosphoric acid esters, diisobutylcarbinol, aliphatic alcohols etc, which are primarily used as anthrahydroquinone solvents.

The invention is further illustrated in the following examples, which, however, are not intended to limit the same. Parts and percent relate to parts by volume and percent by volume respectively, unless otherwise stated.

EXAMPLE 1

In this example hydrogen peroxide was produced using a combination of 75% Shellsol AB (registered trademark for a solvent consisting essentially of $C_4$ alkylbenzene derivatives) and 25% DBPU as solvent. The procedure was carried out as follows:

180 g/l of tetrahydroethylanthraquinone were dissolved in the solvent mixture. Raney nicel was added to a concentration of 28 g/l. Hydrogen gas was introduced and the tetrahydroethylanthraquinone was hydrogenated to about 90%. The nickel catalyst was then removed and the hydrogenated solution oxidized with air. The solvent mixture was analyzed and the hydrogen peroxide content was found to be 17,1 g/l. The hydrogen peroxide was extracted with water and the working solution free from hydrogen peroxide can, after drying, be recycled to the hydrogenation step.

The example shows that a very high amount of tetrahydroanthrahydroquinone could be dissolved in the solvent according to the invention and thus the hydrogen peroxide concentration in the oxidizing solution was very high.

EXAMPLE 2

The solubility of 2-ethylanthraquinone (2-EAQ) and of 2-ethyltetrahydroanthrahydroquinone (2-THEAHQ) was measured in mixtures of 75% Shellsol AB and 25% of two compounds according to the invention.

The solubility of the hydroquinones in the following systems was investigated:
1. Shellsol + Dibutyl propyleneurea (DBPU)
2. Shellsol + Dihexyl propyleneurea (DHPU)

As a comparison the solubility of the hydroquinones was also invenstigated in the following knownsolvent combinations:
3. Shellsol (75%) + Diethyl dibutylurea (DEDBU) (25%)
4. Shellsol (75%) + Trioctyl phosphate (TOF) (25%)
5. Shellsol (75%) + Octyl pyrrolidone (OP) (25%)
6. Shellsol (50%) + Diisobutylcarbinol (nonanol) (50%)

The results are shown in Table I. The solubility for 2-EAQ is shown as the solubility of this in the pure hydroquinone solvent at a temperature of 20° C. while the solubility of 2-THEAHQ is shown at a temperature of 42° C.

TABLE I

| Solvent combination | Solubility of 2-EAQ g/l | Solubility of 2-THEAHQ g/l |
| --- | --- | --- |
| 1 | 101 | 170 |
| 2 | 69 | 125 |
| 3 (comparison) | 68 | 110 |
| 4 (comparison) | 35 | 72 |
| 5 (comparison) | 112 | 128* |
| 6 (comparison) | <30 | 50 |

*This value is taken from EP-A 95822, example 2, and has been recalculated to solubility for hydroquinone. The measurement is made at 50° C., and the value obtained is thus higher than it would have been at 42° C.

As evident from the table the compounds according to the invention are equal or better solvents for hydroquinone as previously known nitrogen containing solvents for the hydrogen peroxide process. As is shown in example 3 below the compounds according to the invention also have a number of other favourable properties. To find a good solvent for hydroquinone for the hydrogen peroxide process means not only the consideration of the solubility of anthraquinone and hydroquinone but also the consideration of a number of other properties to obtain an optimal summary result. Some significant parameters are shown in table II below. The viscosity given was measured with a Brookfield viscosimeter.

TABLE II

| Compound | Density at 20° C. | Viscosity 20° C. | Boiling point 760 mm Hg | Solubility in $H_2O$ w. % |
| --- | --- | --- | --- | --- |
| DBPU | 0.946 | 20 cp | about 350° C. | 0.6 |
| DHPU | 0.914 | 29 cp | about 370° C. | <0.01 |

Tabel II shows good values for some essential properties for solvents for hydroquinone for the hydrogen peroxide process.

Thus a low density (as far below 1 as possible) facilitates the extraction with water as a quicker phase separation is obtained with a lower density.

Besides a low viscosity gives a higher efficiency to the extraction as the medium is more liquid.

A high boiling point gives reduced evaporation of the solvent and thus a reduction of solvent loss and a reduction of pollution in the oxidation step and the drying step, at which air is blown through the reaction mixture.

A low water solubility for the solvent is considered to be a very important property in this application as this brings both a cleaner H$_2$O$_2$-solution and reduced loss of solvent.

A comparative test concerning the distribution of hydrogen peroxide between the different solvent systems and water was effected by extraction of the reaction solutions of example 2 with water in accordance with example 1.

TABLE III

| Solvent combination | Amount of H$_2$O$_2$ in the solvent mixture (corresp. to max. hydroquinone solubility) g/l | Amount of H$_2$O$_2$ in the water phase g/l |
| --- | --- | --- |
| 1 | 24,1 | 500 |
| 2 | 17,7 | 550 |
| 3 (comparison) | 15,6 | 935 |
| 4 (comparison) | 10,2 | 816 |
| 5 (comparison) | 18,1 | 325 |
| 6 (comparison) | 7 | 462 |

In the solvent system according to the present invention a high amount of hydrogen peroxide in the water phase is obtained but not high enough to cause the emulsions formed during the extraction with organic solvents to be explosive. The limit for explosion is at a concentration of about 600 g/l (c.f. SE-A 411 475 and 418 489), which shows that the known solvents 3 and 4 are not very suitable. The concentration obtained in accodance with the invention is so high that the energy costs for destillation to a trade quality is reasonable.

We claim:

1. A process for the production of hydrogen peroxide by reduction and oxidation of an anthraquinone, characterized in that as solvent is used a cyclic urea derivative having the general formula

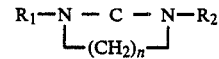

wherein n is 1 to 5 and wherein R$_1$ and R$_2$ are alkyl groups having from 1 to 22 carbon atoms.

2. A process according to claim 1, characterized in that n is 2 to 4.

3. A process according to claim 1, characterized in that R$_1$ is an alkyl group having 3 to 18 carbon atoms.

4. A process according to claim 1, characterized in that R$_2$ is an alkyl group having 3 to 18 carbon atoms.

5. A process according to claim 1, characterized in that the cyclic urea derivative is used in combination with a hydrocarbon solvent.

6. A process according to claim 1, characterized in that the cyclic urea derivative is used in combination with per se known polar solvents.

* * * * *